(12) United States Patent
Raman

(10) Patent No.: US 10,535,086 B2
(45) Date of Patent: Jan. 14, 2020

(54) PRIVATE EMBEDDED MARKETPLACE

(75) Inventor: Srinivasan Raman, Cupertino, CA (US)

(73) Assignee: eBay Inc., San Jose, CA (US)

(*) Notice: Subject to any disclaimer, the term of this patent is extended or adjusted under 35 U.S.C. 154(b) by 803 days.

(21) Appl. No.: 13/407,150

(22) Filed: Feb. 28, 2012

(65) Prior Publication Data

US 2013/0226734 A1    Aug. 29, 2013

(51) Int. Cl.
*G06Q 30/00*    (2012.01)
*G06Q 30/06*    (2012.01)

(52) U.S. Cl.
CPC .................................. *G06Q 30/06* (2013.01)

(58) Field of Classification Search
CPC ............................. G06Q 30/00; G06F 17/30
See application file for complete search history.

(56) References Cited

U.S. PATENT DOCUMENTS

| | | | | |
|---|---|---|---|---|
| 6,064,971 | A * | 5/2000 | Hartnett | G06Q 99/00 706/45 |
| 7,324,968 | B2 * | 1/2008 | Rotman et al. | 705/37 |
| 7,930,237 | B1 * | 4/2011 | Rotman et al. | 705/37 |
| 7,979,340 | B2 * | 7/2011 | MacDonald Korth et al. | 705/37 |
| 8,280,782 | B1 * | 10/2012 | Talreja | G06Q 30/00 705/26.4 |
| 8,352,357 | B2 * | 1/2013 | Rotman et al. | 705/37 |
| 8,452,691 | B2 * | 5/2013 | MacDonald Korth et al. | 705/37 |
| 8,521,642 | B2 * | 8/2013 | Rotman et al. | 705/37 |
| 8,533,054 | B1 * | 9/2013 | Haney et al. | 705/26.1 |
| 8,635,150 | B1 * | 1/2014 | Rotman et al. | 705/37 |
| 2001/0024564 | A1 * | 9/2001 | Young | G04G 15/006 386/212 |
| 2002/0095399 | A1 * | 7/2002 | Devine | G06F 17/3089 |
| 2002/0107786 | A1 * | 8/2002 | Lehmann-Haupt | G06Q 30/02 705/37 |
| 2002/0123955 | A1 * | 9/2002 | Andreski et al. | 705/37 |
| 2003/0177026 | A1 * | 9/2003 | Purcell | G06Q 10/087 705/28 |
| 2003/0200156 | A1 * | 10/2003 | Roseman et al. | 705/27 |

(Continued)

OTHER PUBLICATIONS

PR Newswire, "Sales Online Direct launches AI commerce Storefront to offer merchants and easy turnkey solution for creating their own branded website", dated Feb. 21, 2002. (Year: 2002).*

(Continued)

*Primary Examiner* — Mark A Fadok
(74) *Attorney, Agent, or Firm* — Schwegman Lundberg & Woessner, P.A.

(57) ABSTRACT

Consistent with some embodiments of the present invention, an online marketplace service includes am embedded marketplace service that enables third-party merchants to quickly and easily leverage the online marketplace to offer marketplace functionality via their respective online retail stores. Each third-party merchant can configure the embedded marketplace service to meet its needs. For instance, with a user interface presenting various configuration options, the third-party merchant can select a variety of seller-specific, item-specific, or product-specific aspects that must be satisfied to have item listings or product listings qualify for presentation via the merchant's online retail store.

19 Claims, 6 Drawing Sheets

(56) References Cited

U.S. PATENT DOCUMENTS

| | | |
|---|---|---|
| 2004/0019523 A1* | 1/2004 | Barry .................... G06Q 30/02 705/14.73 |
| 2006/0167756 A1* | 7/2006 | VonBergen et al. ............ 705/26 |
| 2007/0088723 A1* | 4/2007 | Fish .............................. 707/100 |
| 2007/0112635 A1* | 5/2007 | Loncaric ........................ 705/26 |
| 2007/0265910 A1* | 11/2007 | Varghese ............... G06Q 30/02 705/14.2 |
| 2007/0288454 A1* | 12/2007 | Bolivar et al. .................... 707/5 |
| 2008/0294552 A1* | 11/2008 | Kaufman ............. G06Q 20/102 705/40 |
| 2010/0293070 A1* | 11/2010 | Kopelman et al. ............. 705/26 |
| 2011/0004596 A1* | 1/2011 | Gildred et al. ............... 707/740 |
| 2011/0106668 A1* | 5/2011 | Korosec et al. ................ 705/30 |
| 2011/0231260 A1* | 9/2011 | Price .......................... 705/14.61 |
| 2011/0270717 A1* | 11/2011 | MacDonald Korth et al. ............ 705/27.2 |
| 2012/0046994 A1* | 2/2012 | Reisman ...................... 705/7.29 |
| 2012/0059730 A1* | 3/2012 | Jensen ............... G06Q 30/0601 705/26.1 |
| 2012/0173419 A1* | 7/2012 | Viswanath et al. ............. 705/40 |
| 2012/0310971 A1* | 12/2012 | Tran .............................. 707/769 |
| 2012/0316980 A1* | 12/2012 | Rotman et al. ............. 705/26.3 |
| 2012/0316996 A1* | 12/2012 | Shin et al. ................... 705/27.1 |
| 2012/0323795 A1* | 12/2012 | Paparizos ....................... 705/80 |
| 2013/0006794 A1* | 1/2013 | Horvitz et al. .............. 705/26.2 |
| 2013/0173427 A1* | 7/2013 | Swindells et al. ......... 705/26.61 |
| 2013/0185118 A1* | 7/2013 | Rotman et al. .............. 705/7.35 |

OTHER PUBLICATIONS

StoneEdge, "Setting up a monsoon Marketplace shopping cart", Stoneedge.com, dated circa 2011. (Year: 2011).*

* cited by examiner

PRIVATE EMBEDDED MARKETPLACE

TECHNICAL FIELD

The present disclosure generally relates to data processing methods and systems. More specifically, the present disclosure relates to methods, systems and computer program products for facilitating a marketplace system with an embedded marketplace service that enables an online retailer to rapidly deploy an embedded, private (e.g., branded) marketplace.

BACKGROUND

The Internet has given rise to a whole new world of commerce, commonly referred to as electronic commerce or simply e-commerce. The term "e-commerce" encompasses many distinct disciplines that directly support or play a role in the buying and selling of goods and services over electronic, computer-based, networked systems. For example, broadly speaking, e-commerce consists of the entire online process of developing, marketing, selling, delivering, servicing and paying for products and services.

One particular distinction that can be made within the broader realm of e-commerce involves the distinction between what many refer to as online retail stores (sometimes referred to as "e-tailers") and online marketplaces. An online retail store typically consists of one or more servers with which consumers will directly interact via the Internet to purchase goods and services. Generally, with online retail stores, the operating entity (i.e., the merchant or retailer) is ultimately the seller of the goods and/or services. In contrast, an online marketplace involves an electronic system that serves as an intermediary—a sort of virtual meeting place where buyers and sellers can meet to arrange for the exchange of goods and services. Accordingly, the operating entity of an online marketplace is typically not the seller of the goods and services offered via the marketplace. Instead, individual merchants or sellers will list their goods and services via the online marketplace, and the operating entity of the marketplace will typically charge a per-listing and/or per-transaction fee for providing the marketplace system with which sellers connect with buyers.

Recently, some online retailers have attempted to bolster their online retail stores by implementing marketplace-like features in conjunction with their traditional online retail stores and through which additional goods and/or services are offered to consumers. However, such an undertaking involves a host of problems and difficulties. For example, to implement a proprietary marketplace system, first, an online retailer will have to identify and then reach out and partner with various other merchants or sellers who have products or services that are complementary to those being offered via the online retailer's store. This will likely involve negotiating and agreeing on revenue sharing deals with each merchant or seller. In addition, the online retailer must build out the necessary supporting information technology infrastructure required to support and host the marketplace features. Among other requirements, the infrastructure will need to 1) enable merchants and sellers to upload inventory information to the online retailer's system, 2) enable consumer orders on the retail site for a merchant's or seller's goods to be passed on to the merchant or seller, and 3) enable payments to be accounted for and divided appropriately in view of each individual revenue sharing agreement. These and many other requirements make the prospects of implementing a proprietary marketplace system a costly and difficult endeavour.

DESCRIPTION OF THE DRAWINGS

Some embodiments are illustrated by way of example and not limitation in the figures of the accompanying drawings, in which.

DETAILED DESCRIPTION

Figure 1:
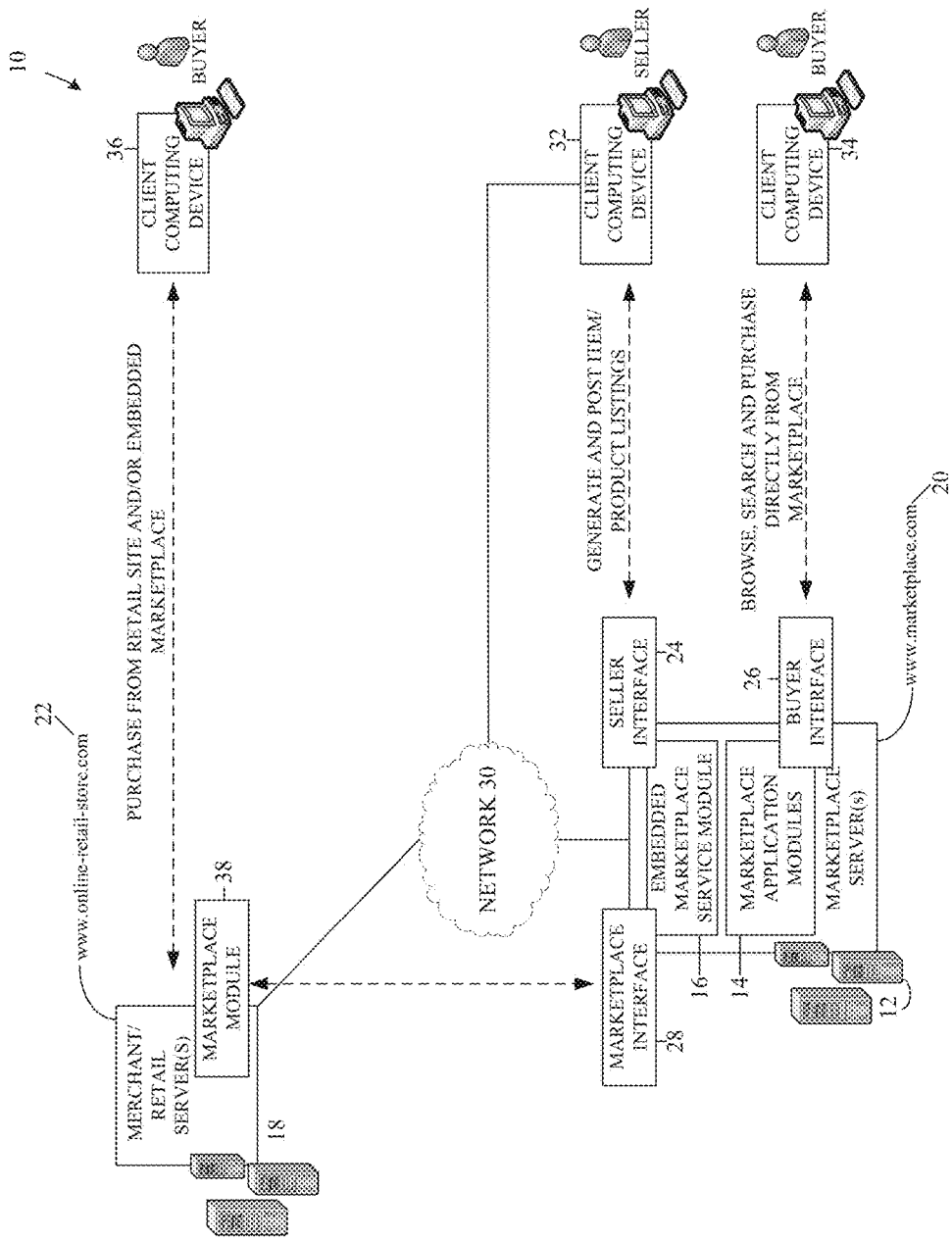
FIG. 1 is a block diagram illustrating a network environment that includes an online marketplace system offering an embedded marketplace service, consistent with some embodiments of the invention.

The present disclosure describes an online marketplace system with an embedded (or, embeddable) marketplace service that will allow an online retailer operating an online retail store to rapidly configure and deploy various marketplace features that operate in conjunction with the online retailer's conventional online retail store. Accordingly, an online retailer can configure the embedded marketplace service, thereby allowing the online retailer to present marketplace listings via the online retailer's online retail store. In the following description, for purposes of explanation, numerous specific details are set forth in order to provide a thorough understanding of the various aspects of different embodiments of the present invention. It will be evident, however, to one skilled in the relevant art, that the present invention may be practiced without all of the specific details.

For purposes of the present disclosure, in the context of an online marketplace, the term "item" refers generally to an individual good or service that is being offered via a listing—specifically, an "item listing"—that is posted to, and then published by, the online marketplace. When a marketplace seller generates an item listing for an item, the marketplace seller typically provides a description of the item, and may specify various attribute values for different attributes or characteristics of the item (e.g., color, size, shape, condition, model, make, age, and so forth). In the context of an online marketplace, the term "product" refers to a good that has a pre-defined set of attributes or characteristics, for example, as might be specified in a product catalog hosted and managed by the marketplace, or by an external catalog service. As such, when a seller generates what is referred to as a "product listing" for a product, rather than provide a description of the product and specify the various product attributes, the seller may simply identify the product by some product identifier (ID) (e.g., a stock keeping unit (SKU) or some similar type of ID) and the marketplace system will automatically generate the product listing to include an appropriate description of the product. As used herein, the term "marketplace listing" is meant to encompass both item listings and product listings.

Consistent with some embodiments of the invention, an online marketplace system hosts and operates an online marketplace enabling buyers and sellers to arrange for the exchange of goods and services. The online marketplace system includes a service e.g., a web service, accessible via an application programming interface (API)), referred to herein as an embedded marketplace service, that allows online retailers who partner with the online marketplace to quickly integrate various features of the online marketplace system for use with their respective online retail stores. As such, online retailers can offer a wide variety of marketplace features to their respective customers via each retailer's existing online retail store without the expense and hassle of both implementing a proprietary information technology solution for a proprietary marketplace, and identifying and partnering with various merchants and sellers to offer goods and services via the proprietary marketplace. Although the embedded marketplace service is described and illustrated herein as being integrated with an online retailer (e.g., a third party operating a merchant/retail server), the embedded marketplace service could just as easily be integrated with any of a wide variety of websites, to include news-related sites, blogs, social networking services, and just about any other type of website. Furthermore, the embedded marketplace service can be branded in any number of ways to operate under a brand agreed upon by the third party and the operator of the marketplace. For instance, the embedded online marketplace may be accessible via the domain of the third party, but be branded with the brand of the online marketplace. Alternatively, the embedded online marketplace may operate under a brand that is associated with the third party operator of the retail website.

As will be described in greater detail below, by leveraging the power of the embedded marketplace service, an online retailer or other website operator) can provide via its online retail store (or other website) a great many marketplace features, some of which are briefly described herein. With some embodiments of the invention, the operator of the online retail website can manipulate various configuration settings, including a variety of filtering mechanisms, to configure the embedded marketplace service to operate as desired with the online retail website. For example, with some embodiments, the embedded marketplace service provides a variety of configuration settings and filtering mechanisms by which the online retailer can select and/or filter various aspects of the marketplace for use with the online retailer's own website. Specifically, one such filtering mechanism allows the online retailer to establish seller eligibility requirements that determine which sellers participating in the marketplace will be eligible to participate, via the embedded marketplace service, in the online retailer's retail site. With some embodiments, the seller-specific filtering mechanism may allow the online retailer to select specific sellers (e.g. by username or other identity) to participate, including sellers who meet selected criteria (e.g., top-rated sellers, power sellers, business sellers, sellers based on feedback, sellers who have agreed to certain revenue sharing agreements, etc.) With some embodiments, a filtering mechanism may allow an online retailer to establish seller policy eligibility requirements. For instance, the filtering mechanism may allow the online retailer to require that participating sellers establish and maintain a certain return policy for items, offer specific payment methods, require specific shipping services, agree to meet specific shipping and handling times, etc. Accordingly, the online retailer may, with the use of the seller policy eligibility filtering mechanism, select sellers who have established various policies that meet or exceed the online retailer's expectations, thus providing a seamless and integrated experience to the end-users of the online retail site.

In addition to specifying various seller-specific filtering criteria, with some embodiments, the embedded marketplace service allows the online retailer to establish item-specific and/or product-specific eligibility requirements. For instance, with some embodiments, a filtering mechanism allows an online retailer to select only certain categories, or specific sub-categories, of items and/or products for eligibility with the online retailer's site via the embedded marketplace service. In addition, the filtering mechanism may allow the online retailer to specify item-specific criteria, such as item conditions (e.g., brand new items, manufacturer refurbished items, used items, etc.), item offering formats (e.g., auction offering, or fixed-price offering, only items that are listed as products in a catalog (e.g., product listings), and other criteria.

Once an online retailer (or other website operator) has established the various seller and item/product eligibility requirements, a backend component or process of the embedded marketplace service analyzes the marketplace listings to identify those listings that meet the eligibility requirements, for example, as determined by the various filtering mechanisms, for the particular online retailer. In some instances, the marketplace listings that satisfy the eligibility requirements are tagged, flagged, or otherwise identified as meeting the eligibility requirements of the particular seller. With some embodiments, the same backend component or process will analyze new marketplace listings, as they are generated at the marketplace, to determine their eligibility for presentation at the online retailer's website via the embedded marketplace service.

Once the eligible listings for a particular offline retailer are identified (e.g., tagged or flagged), the eligible listings are made available to the retail or merchant server of the participating online retailer in one of several ways. For instance, with some embodiments, the eligible marketplace listing information is communicated to the merchant server of the online retailer via aperiodic (e.g., daily, semi-daily, or other scheduled data feed. For instance, with some embodiments, the information representing the eligible marketplace listings may be communicated to the merchant server once per day in a data feed, with periodic updates being communicated throughout the day, to reflect changes in the information. The data feed may be invoked or initiated by the embedded marketplace service, or by the embedded marketplace module residing at the merchant or retailer server. With some embodiments, the data feed may be invoked on a scheduled basis, as well as manually, as needed or desired. With some embodiments, rather than communicating the data from the marketplace server(s) to the individual merchant or retail server of the online retailer, the marketplace listings are simply hosted at the marketplace server and access to the information is provided over the network on an as needed basis. For example, when a search is performed via the online retailer's website, the query may be forwarded to the marketplace servers for processing, and the relevant results returned to the merchant or retail server for further processing and presentation to the user.

The operator of the online retail store can present marketplace listings in a variety of ways. For instance, with some embodiments, marketplace listings may be integrated into the search results provided by the search engine of the online retail store, such that products offered directly by the online retailer are intermingled with those items and products being offered by marketplace sellers via the embedded marketplace service. Alternatively, the retailer may elect to have marketplace listings presented in a separate user interface, such as a separate window pane or frame. In any case, by specifying a variety of configuration settings (e.g., seller and item eligibility requirements, data feed settings, presentation settings, and others) for the embedded marketplace service, an online retailer can configure the embedded marketplace service to suit the retailer's particular needs and complement the retailer's own product offerings and store policies, without the need of developing a highly customized and proprietary marketplace solution. Other aspects and advantages of the inventive subject matter described herein will be readily apparent from the description of the figures that follows.

FIG. 1 is a block diagram illustrating a network environment 10 that includes an online marketplace system offering an embedded marketplace service, consistent with some embodiments of the invention. As illustrated in FIG. 1, the marketplace service is implemented with one or more marketplace servers 12 that are hosting various marketplace application modules 14, and an embedded marketplace service module 16. The marketplace application modules 14 represent instructions executable by one or more processors to facilitate the various applications, functions and services that are provided by the online marketplace service and the embedded marketplace service. For example, individual marketplace application modules 14 may provide applications, functionality and services to include: a marketplace listing service enabling marketplace sellers to generate, post and manage marketplace listings, a payment service for processing payments, a search engine service to enable searching for goods, a reputation service for establishing reputation information for users, a photo and image processing service to enable marketplace sellers to find and process images for use in marketplace listings, and a wide variety of other marketplace features and services. Similarly, the embedded marketplace service module 16 represents executable instructions that serve to make many of the applications, functions and services of the online marketplace accessible to third-party servers hosting online retail stores and other types of websites, such as the server in FIG. 1 with reference number 18.

With some embodiments, such as that illustrated in FIG. 1, the marketplace service can operate independently of the embedded marketplace service 16. For instance, the marketplace application modules 14 of the marketplace servers 12 provide the functionality of the online marketplace under a brand, and an associated Uniform Resource Locator (URL) 20, that are owned by the entity that operates and manages the marketplace service. Simultaneously, the embedded marketplace service module 16 enables some of the applications, functionality and services of the marketplace service to be accessible via one or more online retail stores hosted at respective third-party servers 18, and accessible by potential buyers via an independent URL 22. For instance, using a client computing device 36 with a web browser application, a potential buyer can purchase goods, including those offered via the marketplace service, directly from an online retail store executing at a merchant/retail server 18. With some embodiments, the entity that owns and operates the marketplace service may charge a fee to marketplace sellers and/or marketplace buyers for enabling the sellers and buyers to exchange goods and services via the online marketplace. Similarly, the operator of the marketplace service may charge a fee to its partner retailers for use of the embedded marketplace service.

As illustrated in FIG. 1, the marketplace servers 12 include a seller interface 24, a buyer interface 26, and a marketplace interface 28. Each interface 24, 26 and 28 represents both a user interface component, and one or more data interfaces APIs) by which the marketplace servers exchange data with other computing devices, such as client computing devices 32, 34 and the merchant/retail server(s) 18.

In general, the seller interface 24 includes logic for communicating various user interfaces to a client computing device 32 that is communicatively coupled to the marketplace server(s) 12 via a network 30, such as the Internet. With some embodiments, the user interfaces are in the form of web pages, and are communicated by a web server to a web browser application executing on a client computing device 32 of a marketplace seller. The user interfaces generally enable a marketplace seller to interact with the online marketplace service via the client computing device 32 and, in particular, to generate, post and manage item listings and product listings (collectively referred to as marketplace listings) for items and products, respectively, which are offered via the marketplace service, and in some instances, offered via an online retail store hosted at a merchant/retail server 18 that is configured for use with the embedded marketplace service. With some embodiments, the seller interface 24 may use web-based protocols to communicate user interface information to a desktop or mobile application, including a mobile app executing on a mobile device, such as a smartphone, or tablet computer. With some embodiments, one or more APIs associated with the seller interface enable a marketplace seller to use a desktop or mobile application to generate and post to the marketplace service multiple item listings with a single request. Similarly, using such an API and application, the marketplace seller can access and obtain various information concerning the performance of the seller's item listings and product listings, to include information such as, the number of impressions a particular marketplace listing has received as a result of user's searches, the number of page views that a particular listing has received, and so forth.

The buyer interface 26 enables the marketplace service to communicate various user interface information (e.g., web pages) to potential buyers. As with the seller interface, with some embodiments the buyer interface 26 enables a buyer or potential buyer to interact with the marketplace service via a web browser application executing on a client computing device 34. Various user interfaces allow a buyer or potential buyer to browse for items and products, search for items and products, as well as conclude a purchase transaction for an item or product.

The marketplace interface 28 operates in conjunction with the embedded marketplace service module 16 and includes a user interface component as well as a data interface or API component. Specifically, the marketplace interface 28 provides various user interfaces that enable third-party partners (e.g. online retailers) to configure and customize the embedded marketplace service fir use with their respective online retail stores. Additionally, the marketplace interface 28 provides one or more APIs by which third-party servers hosting online retail stores can exchange data with the online marketplace service. For example, using an API of the marketplace interface 28 and the embedded marketplace service module 16, a third-party server may communicate users' search queries to the marketplace service so that the embedded marketplace service can respond with item listings and/or product listings for presentation via the online retail store. With some embodiments, a marketplace module 38 may reside and execute at a third-party server 18 to facilitate the exchange of data and interaction between the online retail store and the marketplace service. The marketplace module 38 may be provided by the entity operating the marketplace, but may also be configurable and customizable so as to allow integration of the module with the software platform or framework in use at the third-party server.

Figure 2:
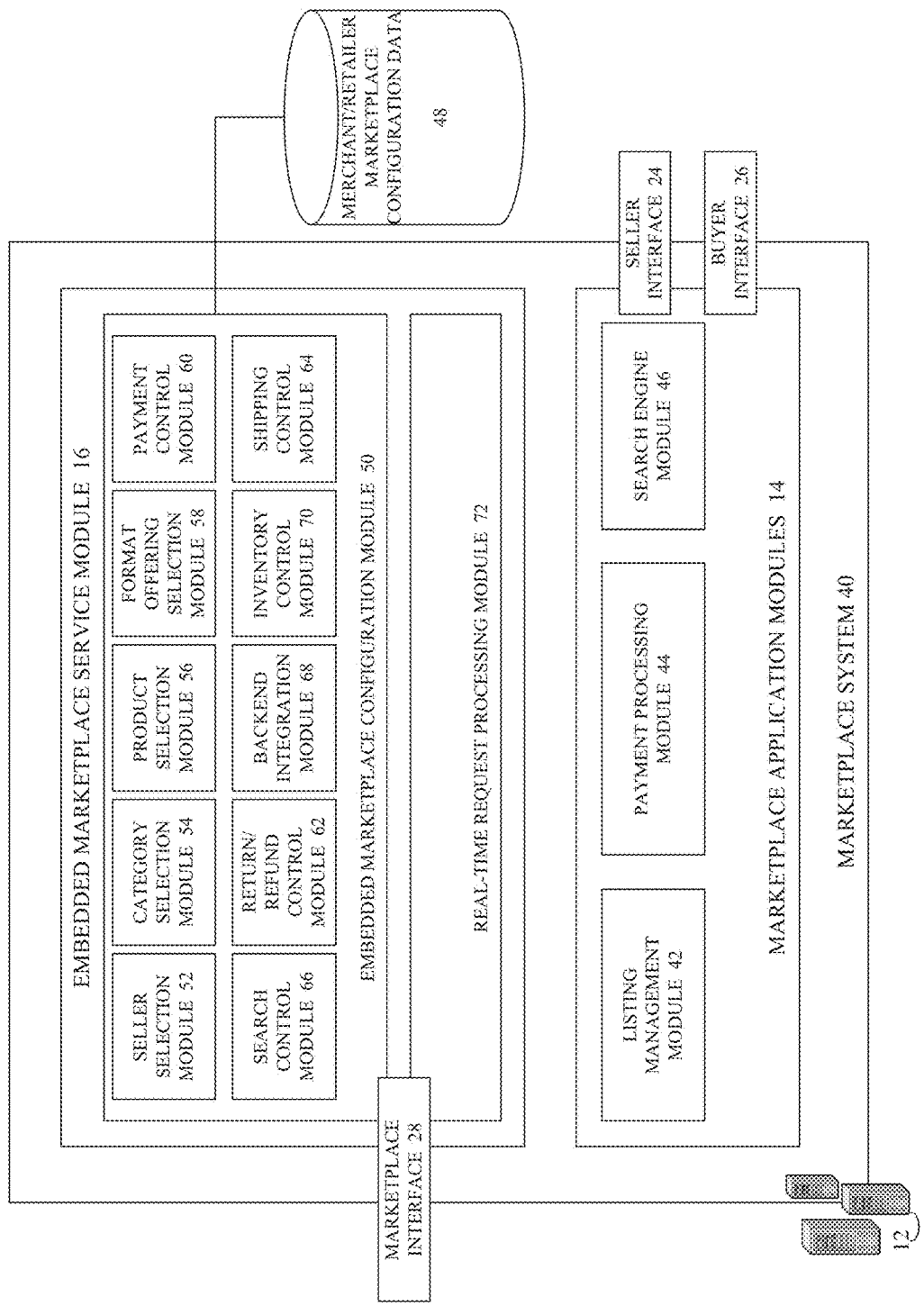
FIG. 2 is a block diagram illustrating various functional modules or components of a marketplace system that facilitates an embedded marketplace service, consistent with some embodiments of the invention.

FIG. 2 is a block diagram illustrating various functional modules or components of a marketplace system that facilitates an embedded marketplace service, consistent with some embodiments of the invention. As illustrated in FIG. 2, the marketplace system 40 is hosted on one or more marketplace servers 12, and includes two primary components or modules a collection of marketplace application modules 14 and an embedded marketplace service module 16. The marketplace application modules 14 represent the executable instructions that facilitate the various applications, functions and services of the marketplace service. For example, the marketplace application modules 14 include a listing management module 42, a payment processing module 44, and a search engine module 46.

A wide variety of other functional modules might be included within the application modules 16 to provide other applications, functions or services for the marketplace service. In addition, those skilled in the relevant art will readily appreciate that the distribution of the various functional modules illustrated in FIG. 2 amongst one or more servers may vary from one embodiment to the next, without departing from the scope of the invention. For example, with some embodiments, one or more particular functions, performed by certain modules, may be performed by a certain cluster of servers, while other servers are dedicated to performing other functions. In particular, with some embodiments, the many modules associated with providing the core functionality of a marketplace service may reside on a first set of servers, while a second set of servers may host the embedded marketplace service, which enables the online retail stores to provide the various marketplace functions via their own respective servers.

In general, the listing management module 42 enables marketplace sellers to generate and post, to the marketplace service, various item and product listings. In addition to specifying various item attributes for use with an item listing, and/or indicating a product identifier for a product to be listed via, a product listing, a seller may indicate whether a particular item or product listing should be considered for presentation to potential buyers at one or more retail stores via, the embedded marketplace service. Accordingly, with some embodiments, a marketplace seller's participation in the embedded marketplace service is controlled by the seller, providing the seller an opportunity to either opt in, or opt out. For instance, with some embodiments, when a seller posts an item to the marketplace service, the item may by default be eligible for presentation at a third party online retail store via the embedded marketplace service. However, the seller may select to opt out such that the seller's listing will not be eligible for inclusion in the embeddable marketplace service. With some embodiments, a seller may opt out altogether, such that his or her marketplace listing will not be eligible for presentation at any third party online retail stores via the embeddable marketplace service. Alternatively, with some embodiments, a seller may opt out on a per retailer basis. Accordingly, a seller may indicate that his or her item is not eligible for presentation at some selected third party online retail stores, but is eligible at others. In some instances, a marketplace seller can select the particular third-party websites at which the seller's marketplace listings are to be presented via the embedded marketplace service. With some embodiments, the listing management module 42 will present information to a seller indicating the eligibility requirements for item and product listings to be eligible for presentation via particular third party websites (e.g., online retail stores) by way of the embedded marketplace service. For instance, a particular online retail store may specify that only fixed price offers (and not auctions) are eligible for presentation via the retailer's online store. Similarly, a particular retailer may specify certain payment processing requirements, shipping requirements, and/or return and refund policies that must be satisfied in order for an item or product listing to be eligible for presentation via the online retail store. Accordingly, with some embodiments, a marketplace seller can make appropriate selections for various listing properties at the time the seller is generating a marketplace listing, so as to ensure that the seller's listing will be eligible for presentation at one or more online retail stores operated by third-party servers.

The search engine module 46 enables the processing of user-submitted search queries. For instance, the search engine module 46 may process search queries received via the marketplace service, or in some instances, received from the server operating an online retail store through the embedded marketplace service. For instance, with some embodiments, when an end-user of an online retail store performs a product search, the search query is forwarded via the embedded marketplace service to the search engine module 46 for processing. When processing a query received via the embedded marketplace service, the search engine will select only the marketplace listings that are relevant (e.g., satisfy the search query) and otherwise satisfy the seller and item eligibility requirements, specified in the configuration data 48 for that particular merchant or retailer, for being presented via the retailer's online retail store. With some embodiments, the marketplace listings that satisfy the seller and item eligibility requirements (as determined by the filtering mechanisms that are configured by the third-party partner) are communicated in a data feed to the server operating the third party website (e.g., an online retail store). In such instances, the marketplace listing information is received, and indexed, at the server of the online retailer, enabling the information to be processed by the backend search engine of the online retail store.

The payment processing module 44 provides a means by which a buyer can transfer hinds to an account of a seller, thereby enabling the parties to a transaction to conclude a purchase transaction via the marketplace service. With some embodiments, the payment processing module 44 may be integrated with an equivalent module residing at a third-party server, such that payments processed by an online retailer may be distributed to a marketplace setter's account hosted with the marketplace service. For instance, when the online retailer prompts a buyer for payment, the payment may first be processed by the online retailer, and divided according to any revenue sharing agreement, such that the amount due to the marketplace seller is transferred to an account held by the seller at the marketplace service, or a payment processing entity.

Prior to using the embedded marketplace service, an online retailer (or other website operator) will configure the embedded marketplace service for use with the retailer's online store. Accordingly, using a user interface associated with the embedded marketplace configuration module 50, the online retailer can specify various configuration settings and parameters that ultimately define how the marketplace service will operate in conjunction with the online retail store. In general, the configuration settings define various aspects of how the embedded marketplace will function with the online retail store, to include, which marketplace listings are presented via the online retail store, and how various aspects of a transaction involving a marketplace listing that is processed at the online store is to be handled.

One set of configuration settings are used to establish seller eligibility requirements and item eligibility requirements that control which marketplace listings are eligible for presentation via the online retail store. Specifically, with some embodiments, a user interface associated with a seller selection module 52 enables an online retailer to browse and search for sellers, so as to enable the online retailer to select certain sellers to participate by providing marketplace listings via the online retail store. With some embodiments, the seller selection module 52 may also include a means for negotiating with selected sellers concerning revenue sharing agreements for items and products sold via the embedded marketplaces services and the online retail store. In addition, using the category selection module 54, an online retailer may select one or more specific categories, or sub-categories, to which marketplace listings are assigned, so that only marketplace listings associated with the selected categories, or sub-categories, are eligible for presentation at an online store via the embedded marketplace service. For example, if an online retail store is serving a particular niche, such as fishing equipment, the online retailer might select a specific category (e.g., fishing equipment) to ensure that the marketplace listings presented via the online store fit within the seller's niche market. Similarly, with the category selection module 54, an online retailer may select certain categories that are to be excluded, such that any listing associated with that particular excluded category will not be presented via, the online retail store.

In addition to selecting particular categories to which marketplace listings are assigned, a product selection module 56 enables an online retailer to specify particular products that are eligible for presentation at the online store. This allows even greater control than category selections and can be particularly useful where the online retailer only wants a small number of products to be sourced via the online marketplace. With some embodiments, more granular controls may allow an online retailer to control the selection of eligible items and products by designating desired, or undesired, item and product attributes.

A format offering selection module 58 enables the online retailer to select only marketplace listings that are being offered via the marketplace with a particular offering format (e.g., fixed-price, or auction, or type of auction, etc.). For instance, some online retailers may wish to exclude any marketplace listings that have an auction format. A payment control module 60 enables the online retailer to specify that only marketplace listings that indicate acceptance of payments processed by certain payment processing entities be eligible for presentation at the online retail store. A return/refund control module 62 enables the online retailer to specify that only marketplace listings with certain return/refund policies are eligible for presentation via the embedded marketplace at an online retail store. Finally, a shipping control module 64 enables the online retailer to specify the particular shipping requirements (e.g., cost and/or shipper) that a marketplace listing must have to be eligible for presentation via the retailer's online retail store.

Although FIG. 2 shows the various configuration modules as being independent modules, in various embodiments, the user interface by which the configuration settings are established may be a single user interface (e.g., web page), or multiple user interfaces (e.g., web pages). With some embodiments, any combination of eligibility requirements or parameters may be specified by the online retailer so that the online retailer has significant control over the buying experience that is made possible by the embedded online marketplace service.

In addition to specifying configuration settings that generally establish eligibility requirements for marketplace listings to be presented via an online retail store, the online retailer may specify various configuration settings that determine how other aspects of the embedded marketplace service will function. For instance, with some embodiments, various configuration settings can be manipulated to control how, when, and whether marketplace listing information is communicated in a data feed from the marketplace servers to the server of the online retailer. Furthermore, the online retailer may specify various configuration settings that control how a transaction is processed, if a buyer selects a marketplace item or product for purchasing. For instance, the online retailer may elect to process the transaction with its own shopping cart service, provided via the retailer's own server, or use a shopping cart service provided by the embedded marketplace service. A backend integration module 68 enables the marketplace sellers to integrate with an online retailer's fulfillment backend. Accordingly, with some embodiments, all post transaction processing for transactions involving marketplace listings may be performed by the marketplace service.

With some embodiments, an inventory control module 70 enables an online retailer to specify various configuration settings and parameters that define when the online retail store will leverage the embedded marketplace service to account for short supply of particular inventory. For example, using the inventory control module 70, an online retailer can dynamically change configuration settings so that the embedded marketplace service is to be invoked and marketplace listings presented when the retailer's inventory level for a particular product has fallen below some threshold level. With some embodiments, an administrator or retail operator will manually make the configuration setting changes based on observed inventory levels for certain products and items. However, with some embodiments, an inventory management module residing and executing at the retail server may automatically communicate a low inventory level signal to the inventory control module 70 at the marketplace system 40 and thereby invoke a configuration setting change for a particular product or item. For instance, in response to receiving the low inventory signal for a particular product, the configuration settings may be changed to include marketplace listings for the particular product. Similarly, using the inventory control module 70, the online retailer may dynamically change configuration settings to broaden the set of sellers that qualify for participation with the online retail store when the number of marketplace listings from eligible marketplace sellers is less than some desired level. For example, the inventory control module 70 may provide inventory level information on a per product basis as the retailer is making changes to the configuration settings, thereby allowing the retailer to see the number of qualifying marketplace listings—based on the desired seller eligibility settings.

Once the online retailer has configured the embedded marketplace service for use with an online retail store, the embedded marketplace service can be initiated or activated to operate in conjunction with the online retailer's store. Accordingly, consistent with the various configuration settings established by the retailer, marketplace listings will be presented with the goods being offered by the retail store. With some embodiments, the server hosting the online retail store will communicate various requests to the embedded marketplace service, and the requests will be processed by a real-time request processing module 72. For example, the online retail store may send a request for marketplace listings that, once received, are to be presented via the online store. The real-time processing module 72 processes these requests and returns to the particular online store the relevant marketplace listings that satisfy the request. With some embodiments, some of the configuration settings may be specified in the request, such that a request may be particularly narrow in scope. For instance, a request may indicate that only marketplace listings for a particular product from a particular seller are being requested. Alternatively, the request may simply include an identifier that identifies the particular online store sending the request. In response, the real-time processing module 72 will access the configuration settings 48 for the online store, and process the request in accordance with the configuration settings. For instance, if the retailer had previously specified that only certain products are to be presented, the request processing module would process the request in accordance with the configuration settings to return only marketplace listings for the particular product.

With some embodiments, a potential buyer browsing the online retail store may perform a search by entering a search query via a user interface of the online retail store. The third-party server hosting the online store may forward the search query with a request for relevant marketplace listings to the embedded marketplace service. The real-time request processing module 72 will then forward the search query to the search engine module 46, which will process the search query to identify the item and product listings that best satisfy the search query. The search results may then be filtered to exclude any marketplace listings that do not satisfy one or more of the configuration settings established by the online retailer. With some embodiments, one or more configuration settings may be passed to the search engine module to limit the scope of the search that is performed by the search engine module. For example, if the online retailer has specified that only marketplace listings from certain sellers are eligible for presentation via the online retail store, then this information may be passed to the search engine module so that the search can be limited to the marketplace listings of the relevant sellers.

Figure 3:
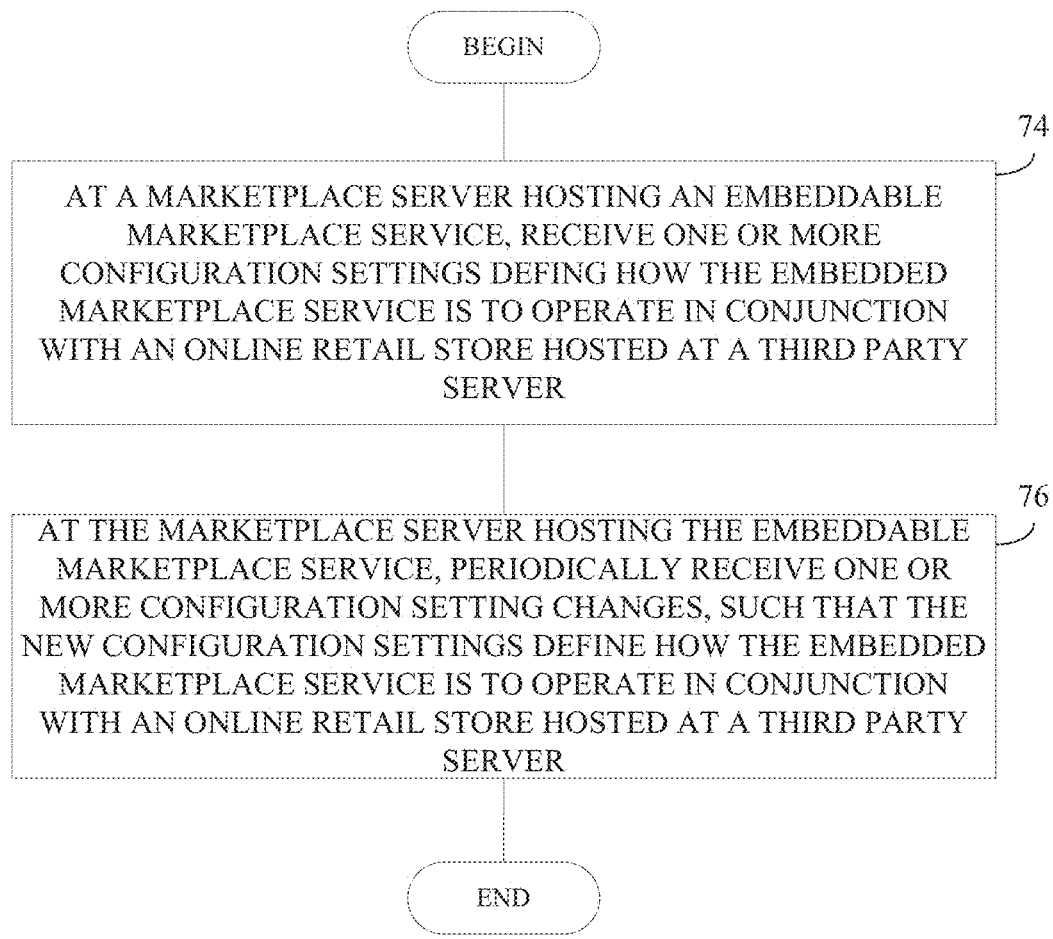
FIG. 3 is a flow diagram illustrating an example method for establishing, and then periodically modifying, one or more configuration settings of an embeddable marketplace service, according to some embodiments of the invention.

FIG. 3 is a flow diagram illustrating an example method for establishing, and then periodically modifying, one or more configuration settings of an embeddable marketplace service, according to some embodiments of the invention. At method operation 74, a marketplace server hosting an embeddable marketplace service receives one or more configuration settings defining how the embedded marketplace service is to operate in conjunction with an online retail store hosted at a third party server. For example, the marketplace system may provide a web-based interface to allow a retailer to access and manipulate the various configuration settings of the embeddable marketplace service. With some embodiments, one or more wizard-like interfaces may be provided, such that the retailer is presented with a series of prompts asking for various information for use with the configuration settings. Once the configuration settings have been established, and the embedded marketplace service has been invoked for the particular online retail store, an administrator or retail operator may periodically and dynamically revise or update a configuration setting, as indicated by method operation 76. With some embodiments, one or more configuration settings may be revised by means of an application programming interface (API) call, such that various configuration settings of the embeddable marketplace service may be revised and updated automatically by a logic component residing and executing at a server of an online retail store.

Figure 4:
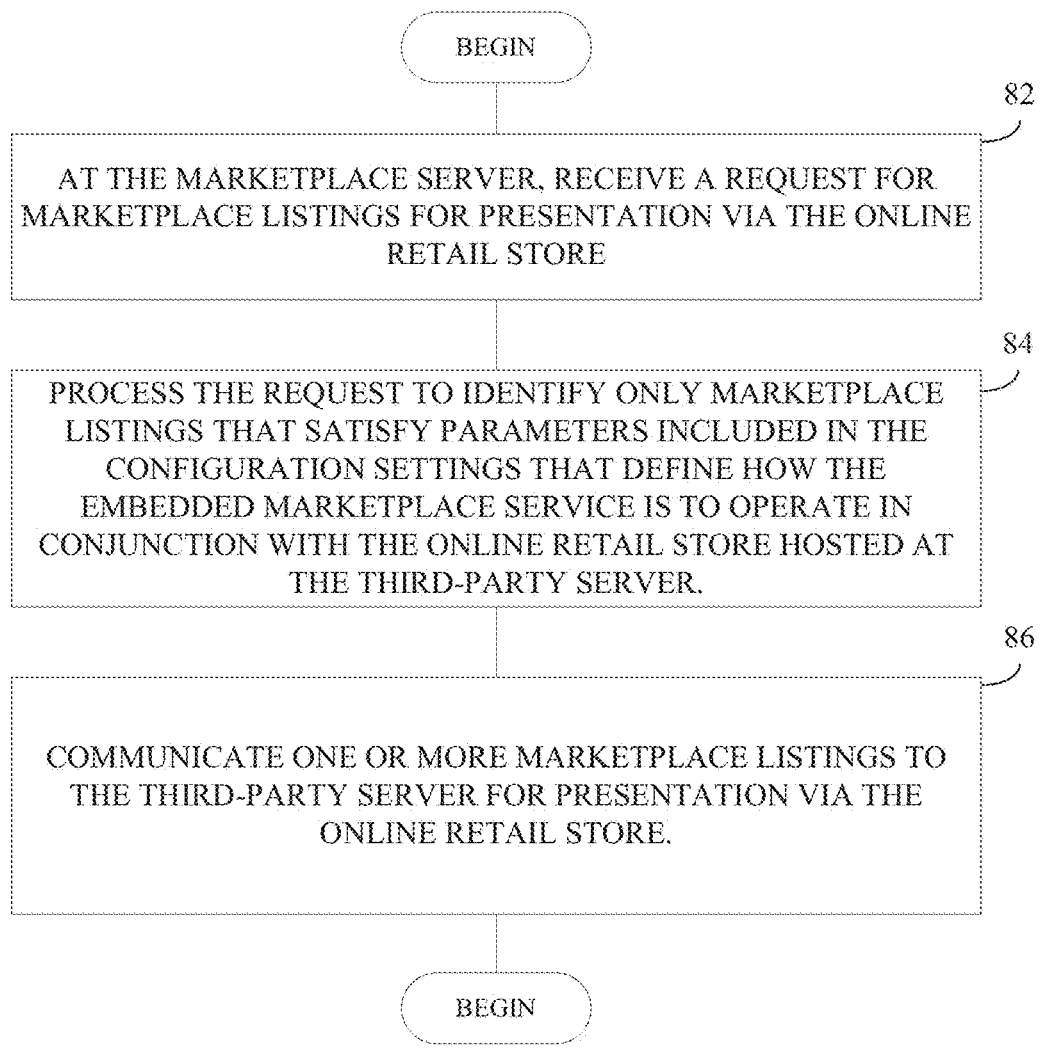
FIG. 4 is a flow diagram illustrating an example method for processing a request, received from a third-party server that is configured to use an embedded marketplace service, the request for marketplace listings to be presented via an online retail store hosted at the third-party server, according to some embodiments of the invention.

FIG. 4 is a flow diagram illustrating an example method for processing a request, received from a third-party server that is configured to use an embedded marketplace service, for marketplace listings to be presented via an online retail store hosted at a third-party server, according to some embodiments of the invention. Generally, the method operations begin after the marketplace server hosting the embedded marketplace service has received one or more configuration settings specifying how the embedded marketplace service is to operate in conjunction with the online retail store. For instance, the configuration settings may specify various eligibility requirements that must be satisfied in order for a particular item or product listing to be eligible fix presentation via the online store. Beginning at method operation 82, the embedded marketplace service receives a request (e.g., an API request) for one or more marketplace listings to be presented via the online retail store. With some embodiments, the request may specify a particular product. Alternatively, the request may simply include a search query submitted by the user of the online retail store. In any case, at method operation 84, the embedded marketplace service processes the request to identify one or more marketplace listings that satisfy the parameters specified in the configuration settings established by the online retailer, and the search query included in the request, if any. For example, the embedded marketplace service may identify only marketplace listings that satisfy a search query, and meet the various eligibility requirements established by the online retailer. Finally, at method operation 86, the embedded marketplace service communicates the one or more marketplace listings to the third-party server, thereby enabling the online retail store to present the marketplace listings to a potential buyer.

Figure 5:
FIG. 5 illustrates an example user interface for use with an online retail store that is configured to use an embedded marketplace service, according to some embodiments of the invention.

FIG. 5 illustrates an example user interface for use with an online retail store that is configured to use an embedded marketplace service, according to some embodiments of the invention. As illustrated in FIG. 5, the example user interface is presenting a search results page generated by the server hosting the online store, and showing a variety of items available via the online store. For example, in the left portion of the user interface 90, several store listings are shown. In the right most portion of the user interface 92, presented in a separate pane or frame is a list of marketplace listings showing marketplace listings that are generally complimentary to those offered by the online retail store. In this example, the marketplace listings have been provided to the online store as a result of the online store forwarding a user's search query to the embedded marketplace service, and the embedded marketplace service responding with marketplace listings that satisfy the search query, and otherwise meet any eligibility requirements set forth in the various configuration settings provided by the online retailer.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 6:
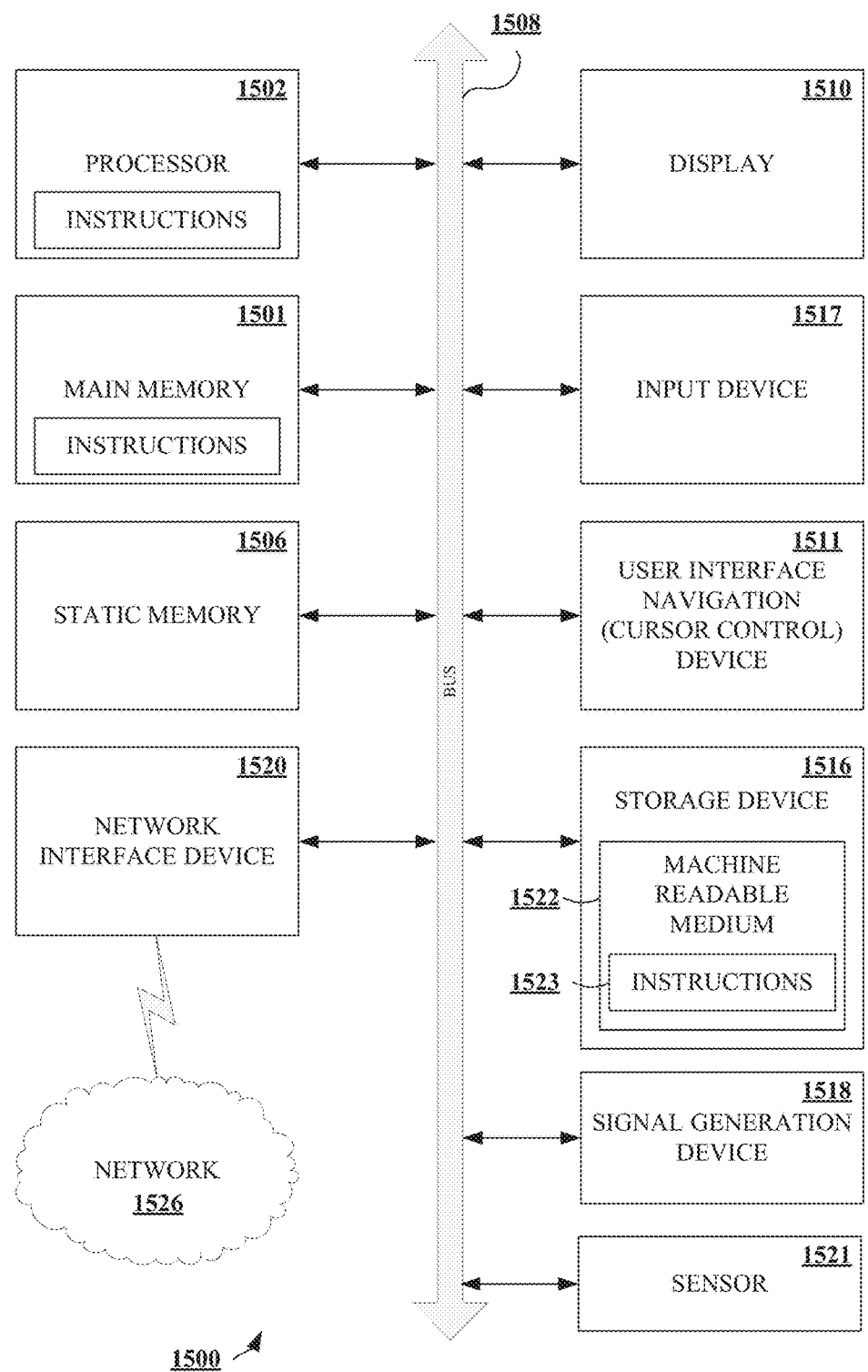
FIG. 6 is a block diagram of a machine in the form of a computing device within which a set of instructions, for causing the machine to perform any one or more of the methodologies discussed herein, may be executed.

FIG. 6 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 my additionally include a storage device 1516 drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system including one or more servers, the system comprising:
   one or more memory devices to store a first set of instructions representing one or more marketplace application modules that operate in conjunction with one another to facilitate a primary online marketplace for the exchange of goods and services between buyers and sellers;
   one or more processors to execute the first set of instructions; and
   a second set of instructions representing an embedded marketplace service module, which, when executed by the one or more processors, enables communication with a third-party server enabling the third-party server to provide functionality of the one or more marketplace application modules and to provide a secondary online marketplace by:
   obtaining an identity of two or more listings from the primary online marketplace;
   receiving, from the third-party server, a seller eligibility configuration setting and a listing eligibility configuration setting for the secondary online marketplace;
   selecting, using a hardware-based filter mechanism, one or more listings of the identified listings for transfer from the primary online marketplace to the secondary online marketplace, the hardware-based filter mechanism filtering the two or more listings based on the seller eligibility configuration setting and the listing eligibility configuration setting; and
   providing, using at least one of the one or more processors, at least one of the one or more selected listings from the primary online marketplace to the secondary online marketplace,
   wherein the secondary online marketplace is configured to integrate the one or more selected listings from the primary online marketplace with content from the secondary online marketplace and to present the integrated one or more selected listings in conjunction with content from the secondary online marketplace, the one or more selected listings from the primary online marketplace associated with a first universal resource locator (URL) that is distinct from a second URL associated with the secondary online marketplace.

2. The system of claim 1, wherein allowing the third-party server to provide the functionality of the one or more marketplace application modules includes enabling the third-party server to present marketplace listings from the online marketplace within an online retail store associated with a universal resource locator (URL) that is distinct from the URL of the online marketplace.

3. The system of claim 1, wherein allowing the third-party server to provide the functionality of the one or more marketplace application modules includes enabling the third-party server to present marketplace listings that have been posted to the online marketplace for items and products being offered by marketplace sellers that have been selected by the third party.

4. The system of claim 3, wherein the interface through which the one or more marketplace application modules can be configured for operation with the third-party server enables selection of marketplace seller eligibility requirements to control which marketplace seller's marketplace listings posted to the online marketplace are eligible for presentation to users of an online retail store hosted by the third-party server.

5. The system of claim 1, wherein allowing the third-party server to provide the functionality of the one or more marketplace application modules includes enabling the third party server to present marketplace listings that have been posted to the online marketplace for items and/or products assigned to categories selected by the third party.

6. The system of claim 1, wherein the interface through which the one or more marketplace application modules can be configured for operation with the third-party server enables selection of item and product eligibility requirements to control which marketplace listings posted to the online marketplace are eligible for presentation to users of an online retail store hosted by the third-party server.

7. The system of claim 1, wherein the interface through which the one or more marketplace application modules can be configured for operation with the third-party server enables a third-party server to receive a data feed of marketplace listing information satisfying seller eligibility requirements and item eligibility requirements as established by the third party.

8. The system of claim 1, wherein the interface through which the one or more marketplace application modules can be configured for operation with the third-party server enables a third-party server to request, using one or more application programming interface (API) calls, marketplace listings from the online marketplace, the marketplace listings being selected to satisfy criteria included in a search query received at the third party server.

9. The system of claim 1, wherein the interface through which the one or more marketplace application modules can be configured for operation with the third-party server enables a configuration of search filters that enable or disable specific products from appearing in the search results presented via an online retail store.

10. The system of claim 1, wherein allowing the third-party server to provide the functionality of the one or more marketplace application modules includes enabling the third party server to integrate a shopping cart service provided by the third-party with a shopping cart service of the online marketplace so as to enable a customer of an online retail store hosted by the third-party server to conclude a purchase transaction for an item or product offered via the online marketplace with the shopping cart service provided by the third-party server.

11. The system of claim 1, wherein the interface through which the one or more marketplace application modules can be configured for operation with the third-party server enables specification of one or more aspects of a marketplace listing that are to be satisfied for the marketplace listing to be eligible for presentation to users of an online retail store hosted by the third-party server, the one or more aspects including:
   an offering format, a condition of an item, a return policy, a refund policy, a shipping service, and a payment method.

12. The system of claim 10, wherein the one or more aspects of a marketplace listing are to be presented to a marketplace seller during a listing operation, or an operation to revise an existing marketplace listing, so as to inform the marketplace seller of eligibility requirements for having marketplace listings presented to users of the online retail store hosted by the third-party server.

13. The system of claim 1, wherein the interface through which the one or more marketplace application modules can be configured for operation with the third-party server enables the third party server to indicate a set of items to be reserved and purchased at the marketplace server when being purchased by an end-user of the online retail store.

14. The system of claim 1, wherein the embedded marketplace service module computes an amount of money due to the operator of the marketplace from the third party, for goods purchased over a period of time by end-users of the online retail store hosted by the third party.

15. The system of claim 1, wherein the embedded marketplace service module enables the third party to provide payments to the online marketplace for all items purchased from the online retail store hosted by the third party server by the end-users of the third party server.

16. The system of claim 1, wherein the embedded marketplace service module enables a third party to receive status updates to marketplace transactions on a periodic basis, or near real time basis, for transactions originating from the online retail store hosted by the third party server.

17. A method comprising:
- facilitating a primary online marketplace for the exchange of goods and services between buyers and sellers, the primary online marketplace being provided by a primary marketplace provider;
- obtaining an identity of two or more listings from the primary online marketplace;
- receiving a seller eligibility configuration setting and a listing eligibility configuration setting for a secondary online marketplace;
- selecting, using a hardware-based filter mechanism, one or more listings of the identified listings for transfer from the primary online marketplace to the secondary online marketplace, the hardware-based filter mechanism filtering the two or more listings based on the seller eligibility configuration setting and the listing eligibility configuration setting; and
- providing at least one of the one or more selected listings from the primary online marketplace for use in the secondary online marketplace based on one or more eligibility filters, the secondary online marketplace being provided via a third-party vendor,
- wherein the secondary online marketplace is configured to integrate the one or more selected listings from the primary online marketplace with content from the secondary online marketplace and to present the integrated one or more selected listings in conjunction with content from the secondary online marketplace, the one or more selected listings from the primary online marketplace associated with a first universal resource locator (URL) that is distinct from a second URL associated with the secondary online marketplace.

18. The method of claim 17, further comprising providing an interface for operating the secondary online marketplace with an online retail store hosted by the third-party server.

19. The system of claim 1, wherein the second set of instructions provides an interface through which the one or more marketplace application modules can be configured for operation with an online retail store hosted by the third-party server.

* * * * *